Oct. 27, 1931.   M. MUHVIC   1,829,602

ANIMAL TRAP

Filed May 20, 1929

Inventor
Matthew Muhvic

By Slough and Canfield
Attorney

Patented Oct. 27, 1931

1,829,602

UNITED STATES PATENT OFFICE

MATTHEW MUHVIC, OF CLEVELAND, OHIO

ANIMAL TRAP

Application filed May 20, 1929. Serial No. 364,388.

This invention relates to animal traps.

One of the objects of this invention is to provide an animal trap adapted to catch and hold an animal without mutilation or injury.

Another object is to provide a trap having means adapted to close upon and embrace an animal or part of an animal with relatively gentle force or pressure, but which, conversely, cannot be opened up by the animal in its effort to escape, even by the application of relatively great force.

Another object is to provide an animal trap of the type having a baited trigger and which is adapted to be sprung by the animal either by pushing or pulling upon the bait.

Another object is to provide a trap which may be easily adapted to catch a variety of sizes and shapes of animals such as rodents, game, reptiles, birds, fish, etc.

Another object is to provide a trap which will be quick and reliable in its action, simple in construction and cheap to manufacture.

My invention is fully disclosed in the following description taken in connection with the accompanying drawings. In the drawings Fig. 1 is a cross-sectional view of my invention with some of the parts shown both in the "set" and in the "sprung" position;

Figure 1:
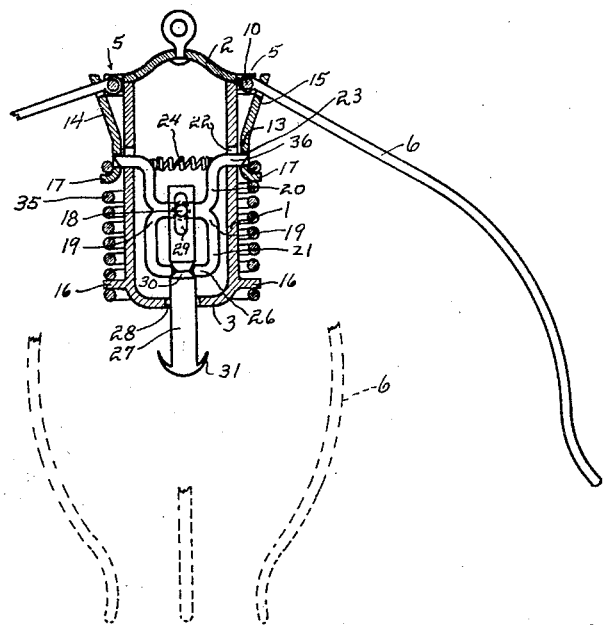

Referring to the drawings I have shown at 1 a cylindrical housing closed at the upper end by a head 2 and at the lower end by a bottom 3. In the head is an eye or ring to which a cord, wire, chain or the like may be attached, for fastening the trap to any suitable object such as a stone, tree or the like. Hinged to the upper end of the housing as at 5—5 are trap jaws 6—6, which when the trap is set take up a position as indicated in solid lines, and when the trap is sprung are moved by means to be described to the dotted line position. The hinges 5 are preferably constructed on the principle of the well known umbrella rib hinge and comprise two spaced annular flanges 7 and 8 on the housing 1, forming a groove 9 therebetween, in which lies a tightly drawn wire 10; the flanges 7 and 8 are interrupted at intervals to provide shoulders 11—11; the jaws are provided at their upper ends with eyes 12, which are placed between the shoulders 11—11 and which pivot on the wire 10 as upon the pintle of a hinge. By this construction any suitable number of jaws 6 may be provided, four being shown or indicated in the drawings. The jaws 6 as shown are made from spring wire, but as will be understood they may be made of other forms and of other materials. Surrounding the housing 1 is a sleeve 13, longitudinally slidable on the housing 1 and provided with upwardly extending ears 14, one of which is provided for each of the jaws 6 and has a perforation 15 through which the jaw 6 passes. By this construction when the sleeve 13 is moved upwardly on the housing 1, the lower side of the perforation 15 will engage the under sides of the jaws 6 and move the jaws all simultaneously to their upper or set position; and when the sleeve 13 is moved downwardly on the housing 1 the upper edge of the perforations 15 will engage the upper sides of the jaws 6 and pull them downwardly into their sprung position.

In connection with the sleeve 13, the following means is provided to hold the jaws in their set position and to release them and move them to the sprung position.

At the lower end of the housing 1 is a pair of lugs 16—16 and at the upper end of the sleeve 13 is a pair of lugs 17—17. A helical tension spring 35 is mounted on the housing 1, surrounding the same, and the upper and lower convolutions of the spring are placed respectively above and below the lugs 17 and 16. The spring is thus anchored in position and exerts resilient force tending always to pull the sleeve 13 downwardly, and when free to do so will move the jaws from their set to their sprung position, as will be understood. To hold the sleeve upwardly in the set position, I provide the following mechanism mounted in the housing 1.

Upon a pin 18 mounted diametrically in the housing 1 is pivoted a pair of rocker arms 19—19 each having an upwardly extending branch 20 and a downwardly extending branch 21. The upwardly extending branch has a horizontal finger 36, which extends through an aperture 22 in the wall of the housing 1 and continues on into an aperture 23 in the sleeve 13, and supports the sleeve in its upper position by engaging the upper edge of the aperture 23. The lower branch 21 of the rocker arm 19 has on its lower end an inwardly directed finger or cam follower 26. A compression spring 24 the ends of which abut upon the two upwardly extending branches 20 of the arms 19 normally tends to force these arms apart and hold the fingers 36 in the apertures 23 and holds the cam followers 26 inwardly for the purpose to be described. Passing into the interior of the housing 1 by means of an aperture 28 in the bottom 3 is a stem 27. The stem has adjacent its innermost end a longitudinal slot 29 embracing the pivot pin 18 and being thus adapted to reciprocate longitudinally in the housing.

The stem is also provided with a groove 30 adjacent the cam followers 26. When the trap is in its set position the cam followers lie in the groove 30 and upon longitudinal movement of the stem 27 the cam followers will be forced out of the groove 30, the groove thus acting as a cam. Thus, upon movement of the stem in either direction, upwardly or downwardly, the cam followers will be forced out of the groove and cause the rocker arms to rock about the pivot 18 and retract the fingers 36 from the apertures 23, thus releasing the sleeve 13 and permitting the jaws to move under the impulse of the spring 35 into their sprung position.

On the lower end of the stem 27 or adjacent thereto hooks or other suitable devices 31 are provided for the attaching of bait to the stem 27 and as will now be apparent when an animal approaches and touches the bait, he will spring the trap, whether be pushes upon the bait or pulls upon it.

Either upward or downward movement of the ears 14 will, by means of the perforations 15 in the ears, open or close the jaws 6. However, the reverse is not true, i. e. generally, the ears cannot be raised and lowered by opening and closing the jaws. When the jaws are in or approximately in their closed or sprung position, if force be applied to the lower ends of the jaws in the direction to spread them open or move them toward their set position, the force exerted on the ears 14 by means of their perforations 15 is largely in a lateral or radial direction and there is only a relatively small component in the direction to raise the ears and because of this, the jaw tends to grip or lock upon the perforation 15. Thus, the jaws are freely closed by downward movement of the sleeve 13 and freely opened upon upward movement of the sleeve 13; the sleeve is not free to move upwardly and will not so move by application of force upon the jaws tending to open them.

By my improved trap construction, therefore, the jaws when sprung will close freely upon an animal, but will not close more than enough to snugly grip the animal or a portion thereof, thus holding the animal with a comparatively gentle restraining force or grip; but on the other hand, it is impossible for the animal to spread the jaws by its efforts to escape.

Thus, my improved trap will in a humane manner catch and hold the animal without injury or mutilation.

Figure 2:
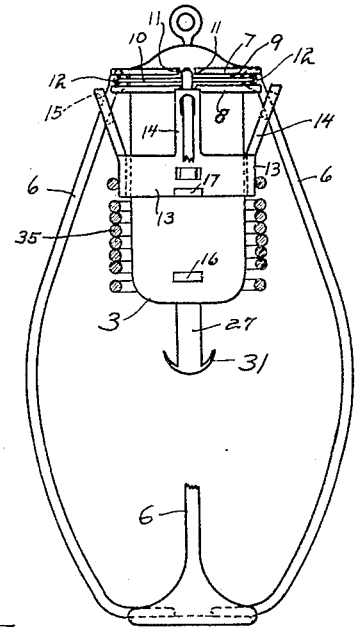
Fig. 2 is an elevational view of the trap as shown in Fig. 1 but in sprung position, and with a modified form of trap jaw.

In the form shown in Fig. 1 the lower ends of the jaws are turned outwardly to provide suitable grippers. In the form shown in Fig. 2 the lower ends of the jaws are provided with grippers lying substantially in a horizontal plane and having inwardly concave edges, those of one gripper overlapping those of another, thus providing a complete enclosure for gripping and holding the animal.

Figure 4:
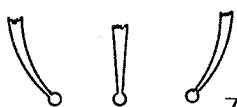
Fig. 4 is a view showing another modification of the trap jaws.
Figure 3:
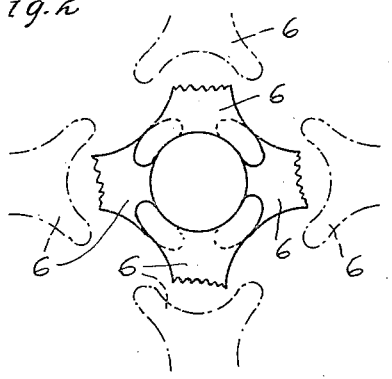
Fig. 3 is a partial bottom view of the trap jaws of Fig. 2.

Generally the jaws are so formed as to seize and hold an animal behind the head or shoulders. In the event that it is desired to employ my trap to catch fish, or in the case of certain animals, it may be desired to provide grippers more in the nature of prongs as illustrated in Fig. 4.

Figure 5:
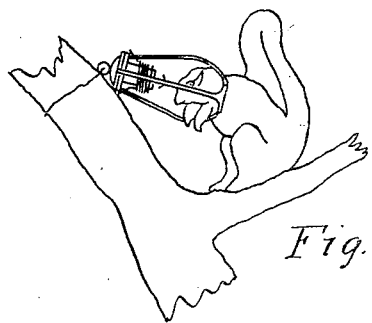
Fig. 5 is a view to a smaller scale than the other figures showing one way in which my invention may be put into practice.

In Fig. 5 I have shown one way of installing and using my improved trap.

Whereas I have described my trap as standing or lying in the vertical position illustrated, it will of course be understood that it may be used in any position.

My invention is not limited to the exact froms shown and described, it being apparent to those skilled in this art that my invention may be embodied in many modifications and changes other than those shown and described, without departing from the spirit thereof.

I claim:

1. In an animal trap, a head, a plurality of trap jaws pivotally mounted on the head, and moved from an opened to a closed position to embrace an animal therebetween by jaw actuating means reciprocatively mounted on the head, spring means mounted upon said actuating means moving said actuating means in jaw closing direction, means for restraining the actuating means in the opened jaw position, said means comprising a trigger mounted on the head, a cam follower on a trigger, and a stem provided with a cam surface engaging the cam follower, the cam releasing the trigger and permitting the jaws to move to the closed position upon movement of the stem in either of opposite directions.

2. In an animal trap, a head, a plurality of trap jaws pivotally mounted on the head, moved from an opened to a closed position to embrace an animal therebetween by jaw actuating means pivotally mounted on the head, spring means mounted upon the actuating means moving the actuating means in the open jaw position, said means comprising a trigger mounted on the head, and animal operatable means for releasing the trigger mechanism, said means being responsive to either a push or a pull by the animal.

In testimony whereof I hereunto affix my signature this 17th day of May, 1929.

MATTHEW MUHVIC.